US010649265B2

(12) United States Patent
Yamada et al.

(10) Patent No.: US 10,649,265 B2
(45) Date of Patent: May 12, 2020

(54) POLYMER CONTAINING SCATTERING TYPE VERTICALLY ALIGNED LIQUID CRYSTAL DEVICE

(71) Applicant: ROLIC AG, Zug (CH)

(72) Inventors: Yuichiro Yamada, Basel (CH); Saya Yoneyama, Shizuoka (JP)

(73) Assignee: ROLIC AG, Zug (CH)

( * ) Notice: Subject to any disclaimer, the term of this patent is extended or adjusted under 35 U.S.C. 154(b) by 0 days.

(21) Appl. No.: 15/518,822

(22) PCT Filed: Oct. 20, 2015

(86) PCT No.: PCT/EP2015/074213
§ 371 (c)(1),
(2) Date: Apr. 13, 2017

(87) PCT Pub. No.: WO2016/062687
PCT Pub. Date: Apr. 28, 2016

(65) Prior Publication Data
US 2017/0242282 A1    Aug. 24, 2017

(30) Foreign Application Priority Data
Oct. 21, 2014   (EP) .................................. 14189630

(51) Int. Cl.
*G02F 1/1334*   (2006.01)
*G02F 1/1337*   (2006.01)
(Continued)

(52) U.S. Cl.
CPC ............ *G02F 1/1334* (2013.01); *G02F 1/137* (2013.01); *G02F 1/1341* (2013.01); *G02F 1/13725* (2013.01); *G02F 1/133528* (2013.01); *G02F 1/133553* (2013.01); *G02F 1/133784* (2013.01); *G02F 1/133788* (2013.01); *G02F 2001/13347* (2013.01); *G02F 2001/13712* (2013.01);
(Continued)

(58) Field of Classification Search
CPC ............ G02F 1/1334; G02F 1/133784; G02F 1/133788; G02F 1/133553; G02F 1/133528; G02F 1/13725; G02F 1/1341; G02F 1/137; G02F 2001/13347; G02F 2001/133742; G02F 2001/133749; G02F 2001/13712; G02F 2001/13756
USPC ...................................................... 349/86–92
See application file for complete search history.

(56) References Cited

U.S. PATENT DOCUMENTS

| 5,305,126 A | 4/1994 | Kobayashi et al. |
| 5,496,497 A | 3/1996 | Takiguchi et al. |

(Continued)

FOREIGN PATENT DOCUMENTS

| EP | 0 488 116 A2 | 6/1992 |
| JP | 2000-347174 A | 12/2000 |

OTHER PUBLICATIONS

Hideya Murai et al., "Homeotropic reverse-mode polymer-liquid crystal device", Journal of Applied Physics, Feb. 15, 1997, pp. 1692-1695, vol. 81, No. 4.

(Continued)

*Primary Examiner* — Charles S Chang
(74) *Attorney, Agent, or Firm* — Sughrue Mion, PLLC

(57) ABSTRACT

The present invention relates to a polymer containing scattering type VA liquid crystal device with very low hysteresis characteristics. The reduction of the hysteresis is achieved by providing a pretilt angle.

17 Claims, 6 Drawing Sheets

(51) Int. Cl.
*G02F 1/137* (2006.01)
*G02F 1/1335* (2006.01)
*G02F 1/1341* (2006.01)

(52) U.S. Cl.
CPC .............. *G02F 2001/13756* (2013.01); *G02F 2001/133742* (2013.01); *G02F 2001/133749* (2013.01)

(56) References Cited

U.S. PATENT DOCUMENTS

| | | | |
|---|---|---|---|
| 5,680,185 A * | 10/1997 | Kobayashi | C09K 19/3852 349/88 |
| 2003/0048401 A1 | 3/2003 | Hanaoka et al. | |
| 2013/0196565 A1* | 8/2013 | Miyake | G02F 1/1337 445/25 |
| 2014/0307211 A1* | 10/2014 | Suwa | G02F 1/133711 349/123 |
| 2016/0170269 A1* | 6/2016 | Noma | G02F 1/133711 349/123 |
| 2016/0237349 A1* | 8/2016 | Hirata | C09K 19/12 |

OTHER PUBLICATIONS

International Search Report for PCT/EP2015/074213, dated Jan. 22, 2016.

* cited by examiner

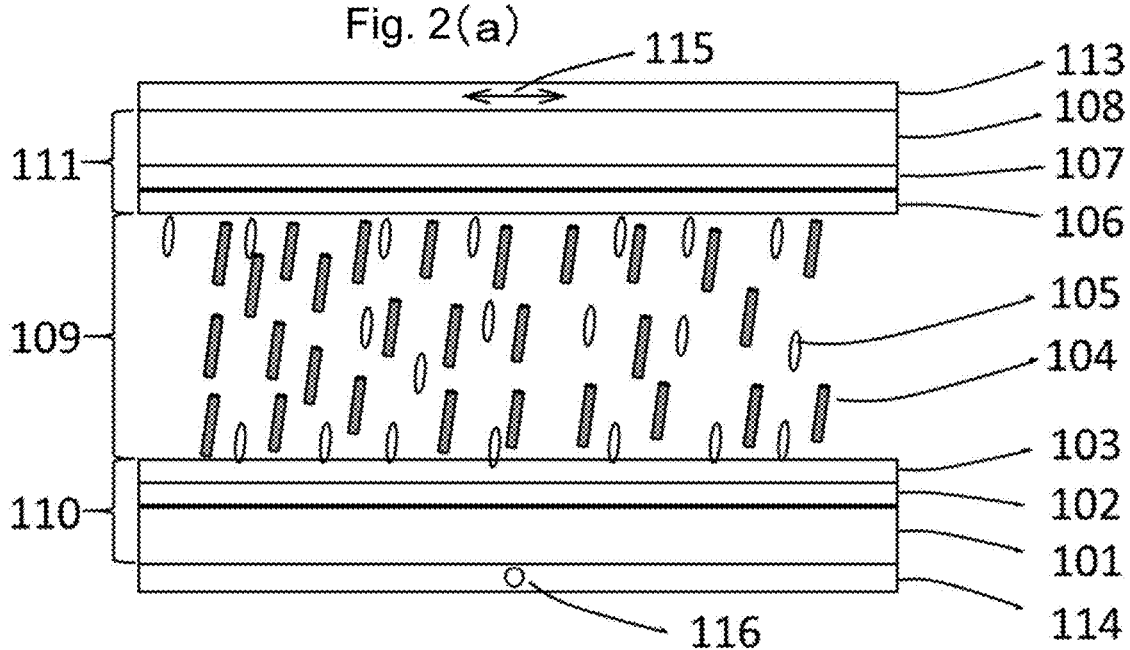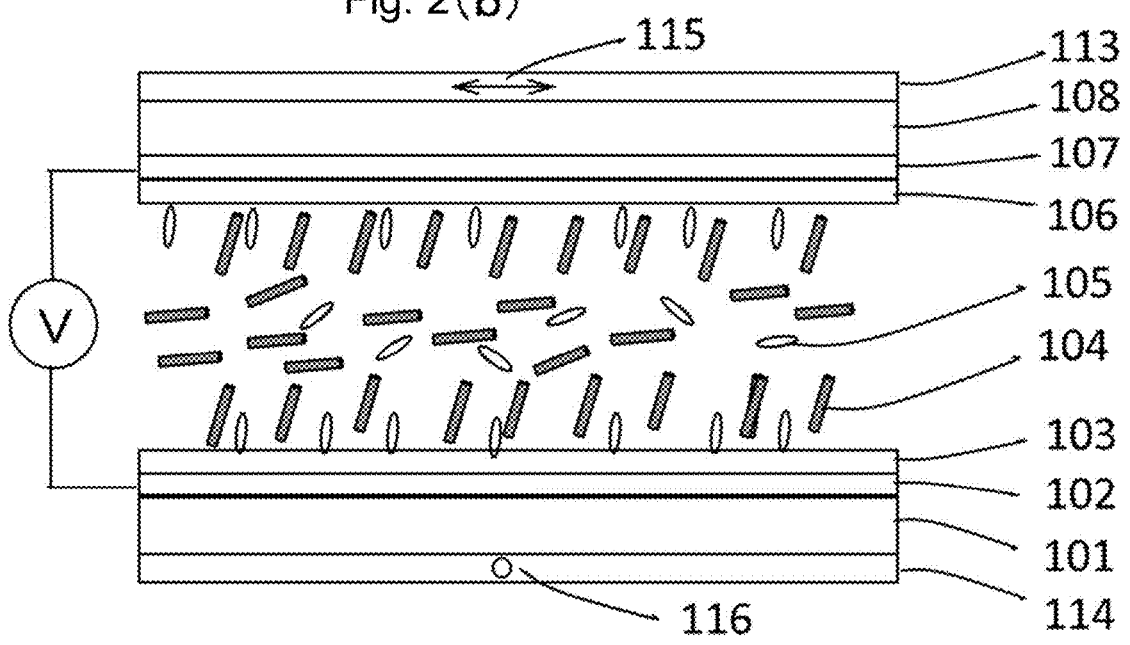

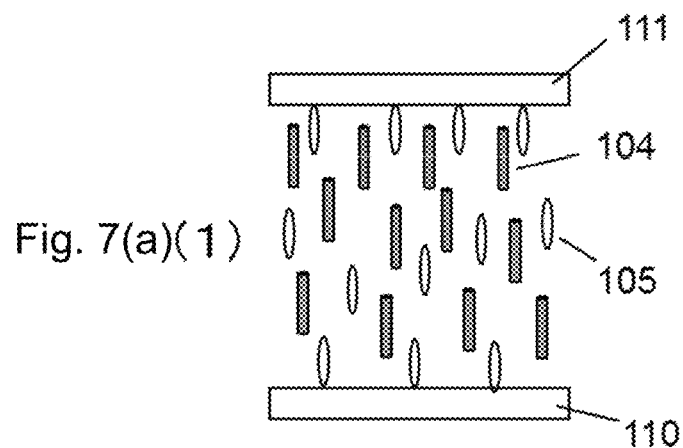
Fig. 7(a)(1)
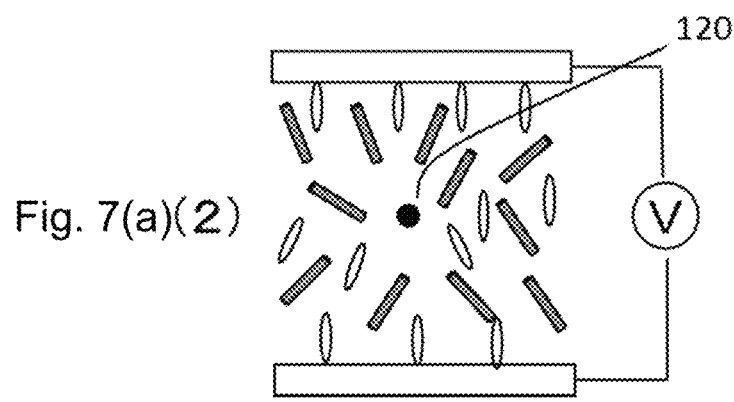
Fig. 7(a)(2)
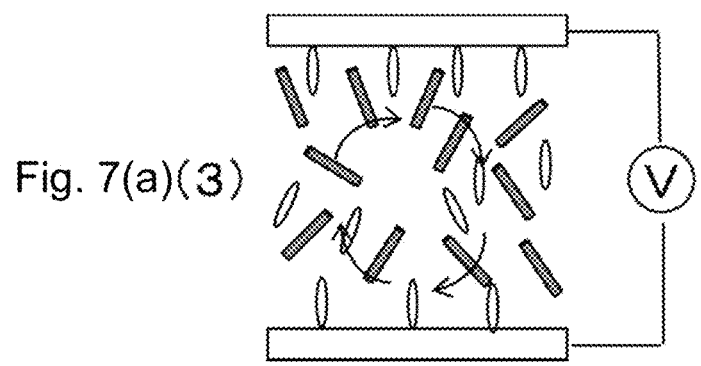
Fig. 7(a)(3)
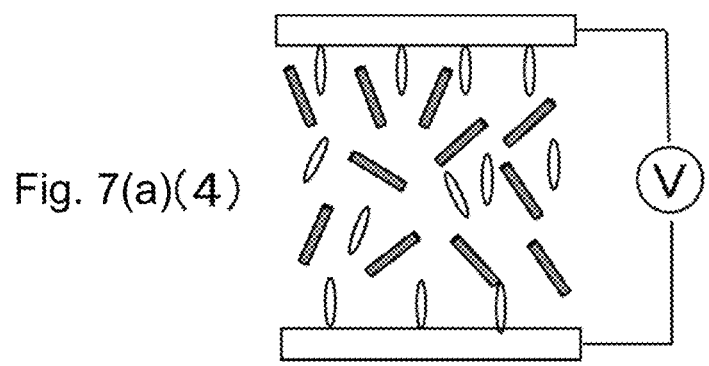
Fig. 7(a)(4)

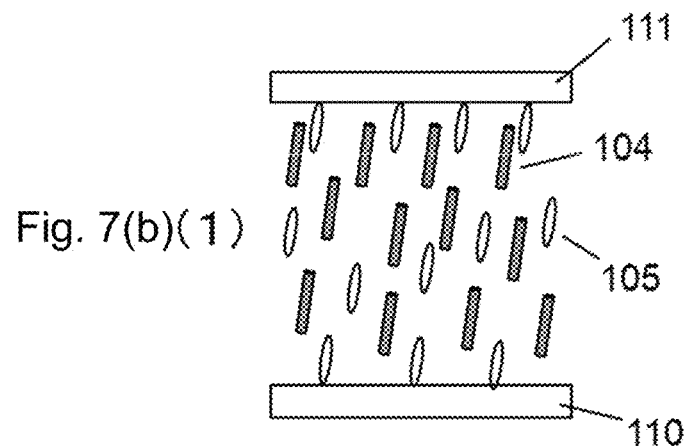
Fig. 7(b)(1)
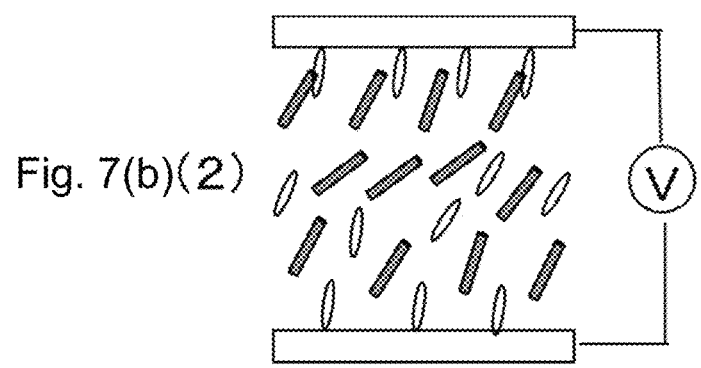
Fig. 7(b)(2)
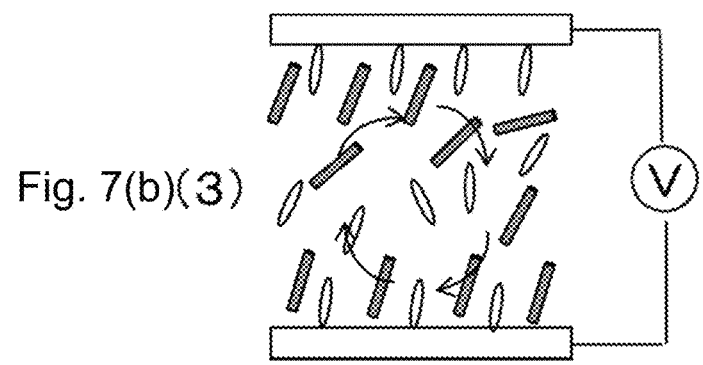
Fig. 7(b)(3)
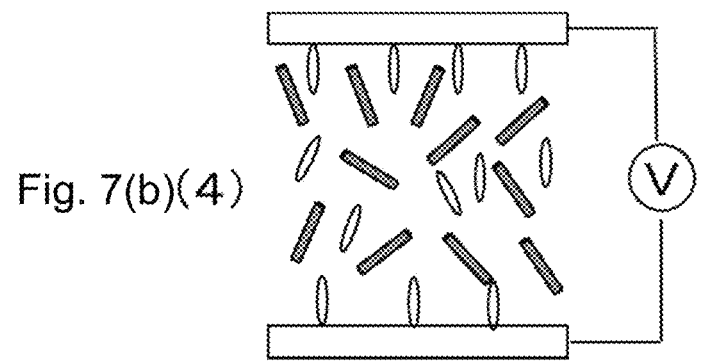
Fig. 7(b)(4)

POLYMER CONTAINING SCATTERING TYPE VERTICALLY ALIGNED LIQUID CRYSTAL DEVICE

CROSS REFERENCE TO RELATED APPLICATIONS

This application is a National Stage of International Application No. PCT/EP2015/074213 filed Oct. 20, 2015, claiming priority based on European Patent Application No. 14189630.8 filed Oct. 21, 2014, the contents of all of which are incorporated herein by reference.

TECHNICAL FIELD

The present invention relates to a polymer containing scattering type VA liquid crystal device with improved hysteresis characteristics.

BACKGROUND OF THE INVENTION

Most of the commercially available liquid crystal displays (LCD) make use of the birefringence of the liquid crystal material and need one or two polarizers to convert the polarization state of the transmitted light into a brightness level. On the other hand, there are LCDs, which are based on scattering of light, and which do not require polarizing sheets. The scattering liquid crystal device is a device that switches from a transparent state to a white turbid state by applying a voltage, thus controlling light transmittance. Because there is no absorption by a polarizing plate such a device offers higher light transmittance. Because of these properties, scattering type liquid crystal devices are also used as switchable windows, which can convert the window from being transmissive to an opaque state. There are two types of scattering liquid crystal devices: the first is the normal type, which is in a scattering state when no voltage is applied and changes to the transparent state upon applying a voltage. The second is a reverse type which is transparent without applied voltage and which changes to the scattering state when a voltage is applied. The normal type is usually used in displays for mobile phones or for transparent-opaque switching of glass windows. For use in a segment type display device, typically the whole display is in a scattering state and an electrode portion becomes transparent upon applying a voltage. For use in a projection display, the reverse type is preferred, such that the display surface is transparent and the electrode portion changes to a scattering state upon applying a voltage.

Most of the scattering type liquid crystal devices are based on a composite material in which a liquid crystal material is dispersed in a polymer. The name "polymer dispersed liquid crystal" (PDLC) is broadly used for the technology and the related devices.

EP0488116A2 describes a constitution of a reverse type polymer dispersion liquid crystal device, which is transparent when no electric field is applied. It uses a liquid crystal polymer composite layer in which a polymer and a liquid crystal are mutually dispersed and both are oriented in the same direction when no electric field is applied. Alignment of the liquid crystals may be parallel or perpendicular to the substrate. If the alignment is parallel to the substrate, liquid crystals with positive dielectric anisotropy are being used, whereas liquid crystals with negative dielectric anisotropy are used in case of vertical alignment (VA). In order to align the liquid crystals, alignment treatment of the substrate surface may be performed, for example by depositing an alignment layer with parallel or perpendicular alignment properties, respectively. In case of parallel alignment, subsequent brushing of the alignment layer defines the orientation direction within the substrate plane, whereas in case of perpendicular alignment no further alignment treatment is required. In the examples, the ratio of polymer to liquid crystals is approximately 1:10 or 15:85. EP0488116A2 teaches that the optimum amount of the liquid crystal is 50-97% and that the proper contrast will not be yielded if the liquid crystal content is higher than 97%. If the composition comprises a polymer precursor, the pre-polymer is polymerized by exposure to uv-light at room temperature.

A drawback of many PDLC devices is a difference of the voltage-transmission curves measured with increasing and decreasing voltage, which is referred to as a hysteresis.

H. Murai et. al., J. Appl. Phys. 81(4), p. 1962, disclose a homeotropic reverse-mode polymer-liquid crystal device, which was investigated for a polymer content of 1 to 5 wt %. The polymer has been formed by initiating the monomer reactions in the liquid crystal phase, which results in a polymer network, which is aligned in the homeotropic direction. A monomer content of 3-5 wt % in the liquid crystal turned out to give good properties. If the content is less than 3 wt %, there is insufficient on-state scattering and often the transmittance does not return to the initial value when the applied voltage is turned off. In the experiments the cell substrates were covered with a homeotropic alignment layer, but no rubbing process was applied.

JP200034714 discloses a VA-LCD with a liquid crystal layer comprising a polymer dispersion. The liquid crystal layer has been made by providing a mixture of a liquid crystal and a monomer between a pair of substrates and polymerizing the monomer while the liquid crystal is in the liquid crystal phase. The polymer dispersion which is formed maintains the pretilt angle of the liquid crystal molecules in the liquid crystal layer.

U.S. Pat. No. 5,496,497 discloses a composition comprising a liquid crystal as well as a mono- and a bifunctional acrylate component, the latter two having a polarity within a certain range. A PDLC device made with such a composition shows reduced hysteresis.

Although one of the advantages of a polymer dispersed liquid crystal device is that it does not require polarizers to observe the brightness difference between on and off state, it still can be equipped with such polarizers, which has the advantage of higher contrast. In case of a normal type VA polymer dispersed LCD the contrast is particularly high. However, the hysteresis of state of the art VA polymer dispersed liquid crystal displays is too high to display grey scale images with high quality.

SUMMARY OF THE INVENTION

The object of the present invention is therefore to provide a scattering type VA liquid crystal device with reduced hysteresis as well as methods for manufacturing the device.

The above objects are achieved by a method for manufacturing a polymer containing scattering type VA liquid crystal device, comprising the steps: providing two substrates with electrodes; manufacturing a cell by arranging the two substrates with the electrodes on the inner side facing each other with a gap between the substrates; filling the cell with a liquid crystal mixture comprising a liquid crystal material having negative dielectric anisotropy and a polymer precursor; applying alignment treatment for the liquid crystal mixture either before or after filling the cell with the liquid crystal mixture, such that the liquid crystal mixture is oriented with a pretilt angle inclined from the normal direction to the substrate, and polymerizing the polymer precursor at a temperature higher than the clearing temperature of the liquid crystal mixture.

The above manufacturing method leads to a polymer dispersion type VA liquid crystal device. In order to not confuse with the known PDLC devices described above, the term polymer containing scattering type VA liquid crystal device is used for the device according to the invention. Without any polarizers attached, the device according to the invention is transmissive as long as no voltage is applied and scatters incident light, if a voltage is applied to the electrodes of the device.

The polymer precursor is preferably a monofunctional, bifunctional or polyfunctional monomer, more preferred a monofunctional, bifunctional or polyfunctional acrylate. It is also possible that the liquid crystal mixture comprises more than one polymer precursor. The polymer precursors may be isotropic materials but it is preferred that at least one polymer precursor has a liquid crystal phase.

The liquid crystal mixture preferably comprises a polymerization initiator. If photo-polymerization is desired it is preferred that the liquid crystal mixture comprises a photo-polymerization initiator.

The main requirement regarding the liquid crystal material is that the dielectric anisotropy is negative. However, the liquid crystal material may be a mixture comprising also compounds that have zero or positive dielectric anisotropy.

Preferably the polymer resulting from the above method is phase separated from the liquid crystal material.

The effect of aligning the liquid crystal material and preferably also the polymer in the liquid crystal material at a certain direction, inclined from the normal direction to the substrate is that the device can be switched substantially without hysteresis. Accordingly, the display performance of a direct-view transmission or of a projection display using an active device such as a segment display, a passive matrix display and TFT (Thin Film Transistor) made by using the method of the invention are markedly improved. Also, when used for dimming of a windowpane, a failsafe dimming windowpane that is transparent when no voltage is applied and is frosted when a voltage is applied is realized.

In preferred methods, an alignment layer is deposited on at least one of the inner surfaces of the substrates.

Any method known in the art can be used to generate inclined alignment. For example, inclined alignment of the liquid crystals in a certain direction can be achieved by alignment treatment of at least one of the inner surface sides of the substrates. The brushing method may then be applied to generate the alignment with a pre-tilt angle for the liquid crystal mixture. Preferably the alignment layer comprises a photo-alignable material, in which, when properly irradiated with aligning light, alignment with a pretilt angle is generated.

Inclined alignment may also be achieved by electric or magnetic fields. In this case alignment treatment of an aligning layer is not required. For example, the cell with the liquid crystal mixture comprising a polymer precursor may be aligned in an external magnetic field prior to initiating polymerization. Preferably, the electric and/or magnetic field is applied also during the polymerization process.

In the context of the present application, the term "aligning light" shall mean light, which can induce anisotropy in a photo-alignable material and which is at least partially linearly or elliptically polarized and/or is incident to the surface of a photo-alignable material from an oblique direction. Preferably, the aligning light is linearly polarized with a degree of polarization of more than 5:1. Wavelengths, intensity and energy of the aligning light are chosen depending on the photosensitivity of the photo-alignable material.

Preferably, the pretilt angle is in the range of 0.2° to 44.5° from the normal direction of the substrate, more preferred between 0.2° and 10° and most preferred between 0.5° and 4°.

Since the inclination is in a certain direction, the azimuthal orientation direction shall mean the projection of the inclination direction onto the corresponding adjacent substrate.

In case that the inner surfaces of both substrates are treated to induce inclined alignment for the liquid crystals in a certain direction, the azimuthal orientation directions of the two substrates may be at any angle with regard to each other. Preferably, the angle between the two orientation directions is 180°, which when rubbing is used as alignment treatment is usually called an anti-parallel rubbing orientation. More preferred is that the angle is about 90°.

One of the above-mentioned electrodes may serve as a reflection layer. It is also possible to add a reflection layer behind the device as seen by an observer.

Preferably, the above-mentioned polymer has been made from a monofunctional, bifunctional or polyfunctional monomer, which preferably has an acrylate group or a methacrylate group. Preferably, the above-mentioned polymer is compatible with the above-mentioned liquid crystal, such that a liquid crystal phase exists.

A polymer containing scattering type VA liquid crystal device according to the present invention comprises a composition having a liquid crystalline phase confined between two substrates with electrodes, wherein the composition comprises a liquid crystal material having negative dielectric anisotropy and a polymer being dispersed therein and the liquid crystal having a pretilt angle with regard to the normal direction to the substrates when no electric field is applied. Without any additional layers, in particular without additional polarizers, the transmission for visible light is preferably more than 90% when no voltage is applied and upon applying a proper voltage the device is in a scattering state. The properties of the device are preferably such, that a transmission for collimated incident light along the incident direction of less than 30% can be achieved by adjusting a proper voltage.

A polymer containing scattering type VA liquid crystal device according to the present invention is preferably manufactured according to one of the methods described above.

BRIEF DESCRIPTION OF THE DRAWINGS

The invention is further illustrated by the accompanying drawing figures. It is emphasized that the various features are not necessarily drawn to scale. In particular the size and form of the polymer as depicted in the figures shall in no way limit the molecular weight or the conformation of the polymer.

FIG. 1(a) shows an operating state when no electric field is applied and FIG. 1(b) shows an operating state when an electric field is applied.

FIGS. 2(a) and 2(b) shows the device of FIG. 1 with an additional polarizer on both sides of the device.

FIGS. 7(a)(1)-(4) and 7(b)(10-(4) are schematic drawing of the switching procedure when a voltage has been applied in the comparative example (FIG. 7(a)) and in the example 1 (FIG. 7(b)).

DETAILED DESCRIPTION OF THE INVENTION

Figure 1A:
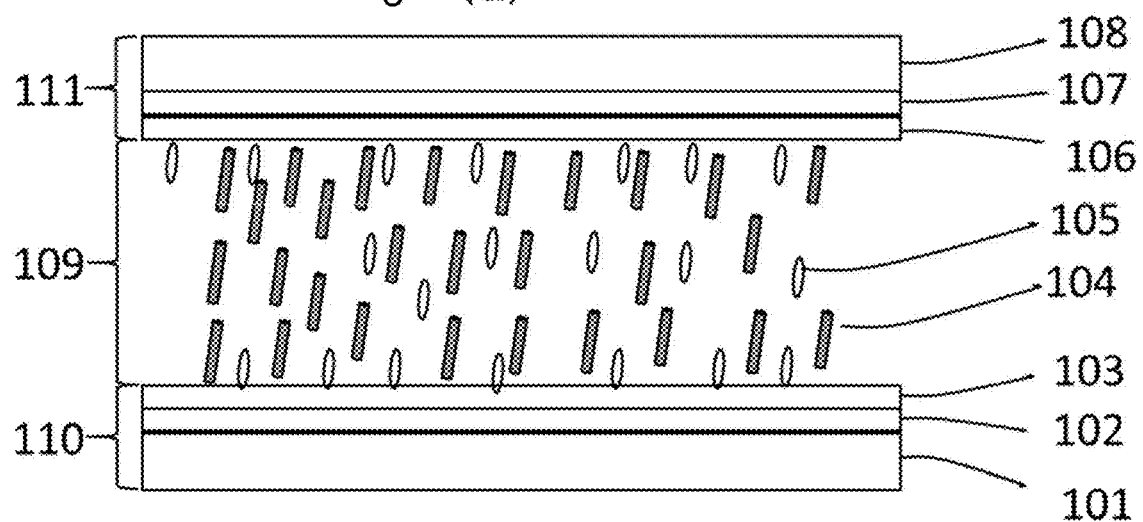
FIGS. 1(a) and 1(b) are schematic drawing showing the section of the polymer containing scattering type VA liquid crystal device according to the present invention.

An embodiment of a polymer containing scattering type liquid crystal device according to the present invention is shown in FIG. 1(a). A liquid crystal polymer composite layer 109, comprising a liquid crystal material 104 and a polymer 105, is sandwiched between two transparent substrates 101 and 108. The liquid crystal material 104 has negative dielectric anisotropy and is oriented in a direction slightly inclined from the vertical direction to the substrate. Preferably also the polymer is oriented in a direction slightly inclined from the vertical direction to the substrate. The polymer 105 has been made by polymerization of polymer precursors which were dissolved or dispersed in the liquid crystal material 104. During polymerization the temperature was above the clearing temperature of the mixture comprising the liquid crystal material and the polymer precursor. Preferably, the polymer precursors are miscible with the liquid crystal material 104. Preferably, the concentration of polymer precursor in the mixture is less than 10 wt %, more preferred less than 3 wt % and most preferred less than 2 wt %.

The two substrates 101 and 108 have transparent electrodes 102 and 107, respectively, at the inside surfaces, and alignment films 103 and 106 are further formed on the transparent electrodes 102 and 107, respectively. The substrate including the electrodes and the alignment films form the coated substrates 110 and 111, respectively. The liquid crystal material 104 and the polymer 105 are sealed between the coated substrates 110 and 111. The alignment films 103 and 106 have been subjected to orientation treatment in order to cause an alignment in a direction slightly inclined from the vertical direction of substrates 101 and 108.

If no electric field is applied, as shown in FIG. 1(a), the liquid crystal material 104 and preferably also the polymer 105 are positioned in parallel in the direction slightly inclined from the vertical direction to the substrate. In this state, there is no local change in refractive index so that it is transparent. When a voltage is applied to the transparent electrodes 102 and 107 the liquid crystal 104 starts to further incline towards the direction parallel to the substrate, and the polymer simultaneously begins to move in the electric field direction to collide with the liquid crystal molecules, which causes a light scattered state, and the device becomes turbid.

Figure 1B:
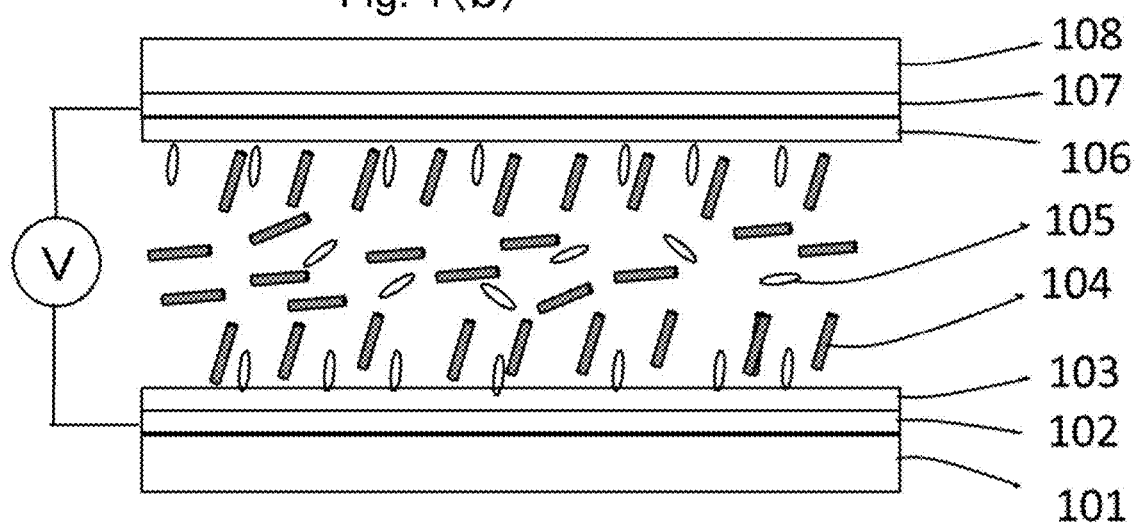

Since the device is in a transparent state without applied voltage and is in a scattering state when a proper voltage is applied, it is possible to switch from transparent to opaque or to intermediate transparency, which offers different brightness levels. Accordingly, for the transparent device of FIG. 1, the bright state is the transmissive state, which corresponds to FIG. 1a, whereas the opaque state corresponds to FIG. 1b.

Preferably, the device further includes one or two polarizers, which has the advantage of higher contrast. For the transmissive device of FIG. 1, polarizers 113 and 114 may be arranged on both sides of the device, as shown in FIG. 2. Preferably, the polarization directions of the two polarizers are crossed with each other, as indicated by the arrow 115 for a direction within the drawing plane and the circle 116 for a direction perpendicular to the drawing plane. Light, which is incident vertically, for example from the top of FIG. 2a, is linearly polarized by polarizer 113 with a polarization direction according to the direction 115. As long as no voltage is applied to the device, as in FIG. 2a, the vertically aligned liquid crystal material does not change the polarization state of the light and, hence, the polarization direction of the light after passing the composite layer 109 is still along the direction 115 and, therefore, it is blocked by the polarizer 114. Accordingly, FIG. 2a corresponds to the dark state.

When a proper voltage is applied to the electrodes, as shown in FIG. 2b, the composite layer turns into a scattering mode. Light, which is incident from the top of FIG. 2a, is linearly polarized by polarizer 113 with a polarization direction according to the direction 115. In the composite layer the light is scattered, which at the same time depolarizes the light, depending on the scattering efficiency. As scattering gets stronger with higher voltage applied, depolarization increases with increasing voltage, up to a maximum. As a consequence, the light which is depolarized can partially pass the polarizer 114 at the bottom. With the voltage for maximum transmission applied, FIG. 2b corresponds to the bright state. For intermediate voltages any grey level between the dark state and the bright state can be adjusted. Because the light transmission in the off state of FIG. 2a mainly depends on the extinction ratio of the polarizers, very high contrast can be achieved. If the light is incident from an oblique direction, the refractive index anisotropy of the vertically aligned liquid crystal material in the off state (FIG. 2a) causes the polarization state of the light to change, with the consequence that part of the light can pass the polarizer 114, which decreases the contrast for obliquely incident light. To improve the performance for obliquely incident light, a compensation foil, for example a negative c-plate, can be inserted anywhere between polarizer 113 and polarizer 114, in the same way as it is done in the commercially available vertically aligned multi-domain LCDs. Preferably, the compensation layer is between substrate 108 and polarizer 113 and/or substrate 101 and polarizer 114. If a voltage is applied (FIG. 2b), obliquely incident light is scattered with a high symmetry, which has the effect that there is not a strong dependency of the brightness on the viewing angle. Therefore, a scattering type VA-LCD with two crossed polarizers (FIG. 2) provides symmetric viewing angle performance without the need of complex pixel subdivision as this is done in the well-known multi-domain VA-LCDs. This advantage leads to decreased production costs along with decreased complexity.

In a preferred embodiment of the invention a reflector is arranged on the substrate opposite the observer side, such that the device can be operated in reflective mode. The reflector may be before or behind the substrate as seen from the observer. Preferably, the electrode is formed as a reflector. If the reflector is between the composite layer 109 and one of the substrates, said substrate may be opaque.

The present invention is explained more specifically by the following examples:

Example 1

On the surfaces of two substrates 101 and 108 transparent conductive films ITO (Indium Tin Oxide) are formed by the sputtering method. On top of the electrodes the material for vertical alignment 4811 (available from Nissan Chemical Industries, Ltd.) is coated using a spin coater. The coated substrates 110 and 111 are prebaked on a hot plate at 80° C. for 60 seconds, and then baked in an oven at 200° C. for 40 minutes. Thus, the alignment films 103 and 106 for vertical alignment each having a thickness of about 100 nm are formed. The surfaces of the alignment films 103 and 106 are subjected to rubbing treatment for 10 times, using a rubbing equipment, in which a polyester nonwoven fabric (fiber length: 2.0 mm) is wound on a roller having a diameter of 30 mm and the pressure is set to about 40 g. Spacers having a diameter of 3 μm are spread on the coated substrate 110, a binary epoxy adhesive is coated onto the outer periphery of the substrate 110, and the coated substrates 110 and 111 are fixed so that the cell thickness is 3 μm.

As the liquid crystal 104, No. 820050 (available from LCC Corporation), NI point (nematic-isotropic transition temperature) 100.5° C., dielectric anisotropy Δε=−5.69 is used. The UV curable bifunctional monomer

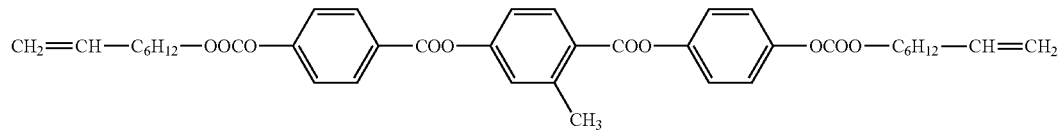

is added as a polymer precursor in an amount of 0.7 to 2.0 wt % with regard to the mixture comprising the liquid crystal and the polymer precursor. As the polymerization initiator, Irgacure 907 (available from BASF AG) is added in an amount of 15 wt % based on the amount of the bi-functional monomer. A mixture of the liquid crystal, the photopolymerizable monomer and the polymerization initiator is injected into the space between the substrates 101 and 108 by utilizing capillary forces. The liquid crystal cell is placed on a hot plate, the temperature of which had been controlled at 101° C. to 103° C., and irradiated with UV rays for 32 minutes in a UV box (manufactured by KENIS Ltd.) at an intensity of 5.0 mW/cm² (352 nm), upon which the polymer 105 is formed by polymerization of the polymer precursors.

The operating principle of the device thus prepared may be explained as follows. The liquid crystal 104 and the polymer 105 shown in FIG. 1 show the similar refractive index anisotropy, a refractive index in the parallel direction to the orientation direction is about 1.52 and a refractive index in the vertical direction to the orientation direction is about 1.73. Accordingly, as shown in FIG. 1(*a*), when no electric field is applied, the liquid crystal 104 and the polymer 105 are oriented to the same direction and the refractive index is as same as 1.52, so that light is not scattered and the device is transparent.

In contrast, as shown in FIG. 1(*b*), when an AC electric field is applied between the electrodes 102 and 107, the direction of the polymer 105 deposited on the surface remains unchanged, but the liquid crystal 104 starts to rotate in a direction that intersects the direction of the electric field. In this case, the effective refractive index increases to about 1.73, and a difference in the refractive index of about 0.21 is generated from the refractive index 1.52 of the polymer deposited on the surface. Also, the polymer 105 dispersed in the liquid crystal begins to move to the electric field, and the molecular movement thereof causes collision with the liquid crystal molecules to generate dynamic scattering. Accordingly, both scattering due to the difference in refractive indexes between the polymer 105 at the surface and the liquid crystal 104 and dynamic scattering due to collision of the polymer 105 and the liquid crystal 104 occur.

Figure 3:
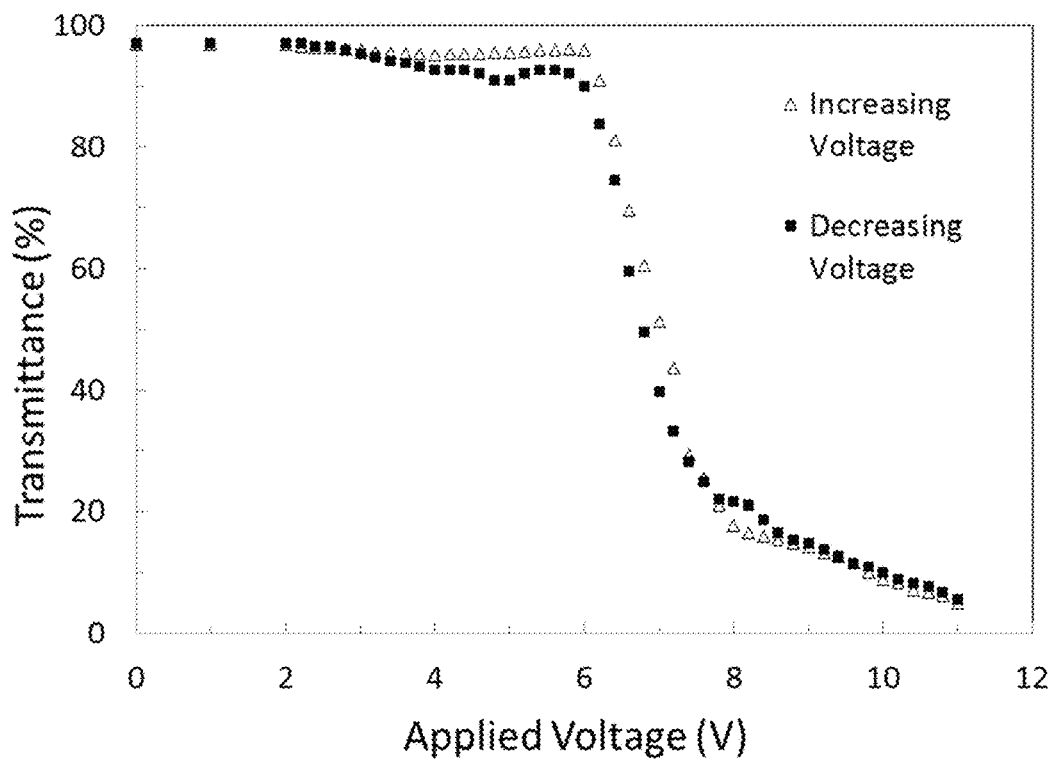
FIG. 3 is a graph showing the electrooptical characteristics of the polymer containing scattering type liquid crystal device of example 1.

The voltage transmittance characteristics for increasing and decreasing voltage of a device which was manufactured using a liquid crystal mixture comprising 0.7 wt % of a bifunctional monomer is shown in FIG. 3. A rectangular wave of 0 to 11V with a frequency of 60 Hz is applied to the liquid crystal device. Regarding measurement of a transmission intensity, measurement of scattering intensity is carried out by irradiating the liquid crystal device with a He—Ne laser (632.8 nm), and observing the light by the Pin type photodiode S3883 (Hamamatsu Photonics K.K.). From the two curves of FIG. 3 it can be understood that good display performance can be obtained substantially without hysteresis.

Example 2

As in example 1, layers of the vertical alignment material 4811 (Nissan Chemical Industries, Ltd.) are applied by spin coating on substrates 101 and 108, having conductive ITO films. After thermal treatment, the alignment films 103 and 106 are subjected to the rubbing treatment for 10 times. Spacers having a diameter of 3 μm are spread onto the substrate 101, a binary epoxy adhesive is coated onto the outer periphery of the substrate 101, the substrates 101 and 102 are so fixed that the cell thickness is 3 μm.

As the liquid crystal 104, No. 820050 (available from LCC Corporation), NI point: 100.5° C., dielectric anisotropy Δε=−5.69 is used. The UV curable monofunctional monomer

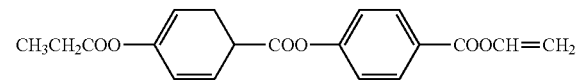

is added as a polymer precursor in an amount of 0.7 to 2.0 wt % with regard to the mixture comprising the liquid crystal and the polymer precursor. As the polymerization initiator, Irgacure 907 (available from BASF AG) is added in an amount of 15 wt % based on the amount of the monofunctional monomer. A mixture of the liquid crystal, the photopolymerizable monomer and the polymerization initiator is injected into the space between the substrates 101 and 108 by utilizing capillary forces. The liquid crystal cell is placed on a hot plate at a temperature of 101° C. to 103° C., and irradiated with UV rays for 32 minutes in a UV box (manufactured by KENIS Ltd.) at an intensity of 5.0 mW/cm² (352 nm).

Figure 4:
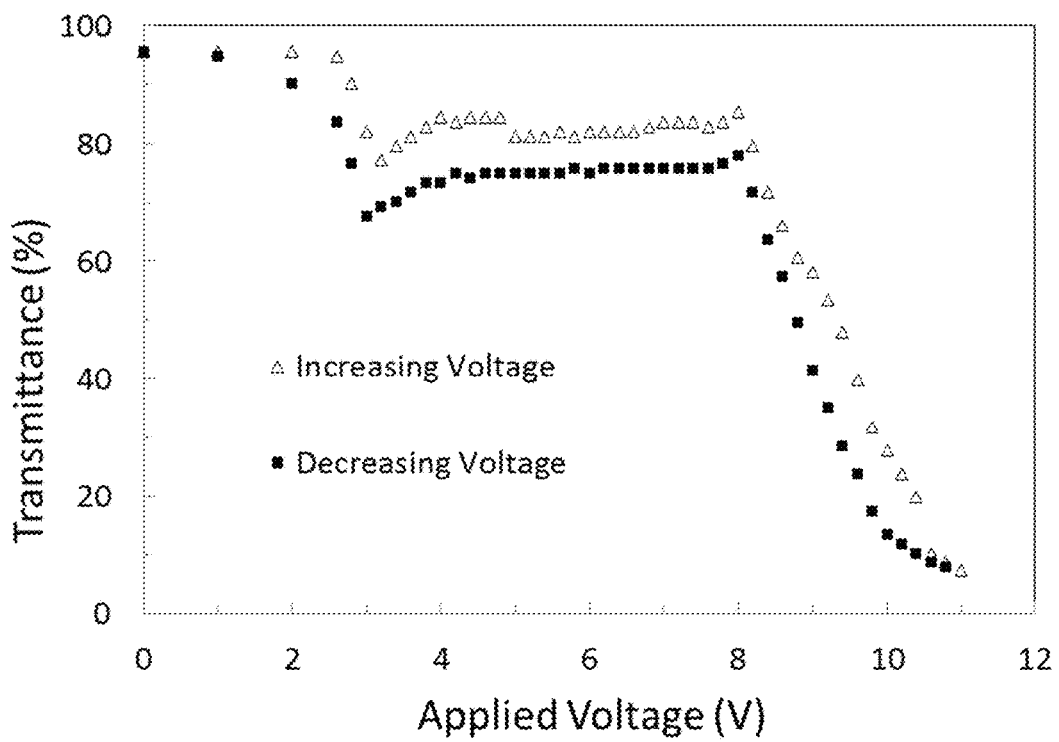
FIG. 4 is a graph showing the electrooptical characteristics of the polymer containing scattering type liquid crystal device of example 2.

The voltage transmittance characteristic for increasing and decreasing voltage of a device which was manufactured using a liquid crystal mixture comprising 0.7 wt % of a monofunctional monomer is shown in FIG. 4. A rectangular wave of 0 to 11V with a frequency of 60 Hz is applied to the liquid crystal device. Regarding measurement of a transmission intensity, measurement of scattering intensity is carried out by irradiating the liquid crystal device with a He—Ne laser (632.8 nm), and observing the light by the Pin type photodiode S3883 (Hamamatsu Photonics K.K.). From the two curves of FIG. 4 it can be understood that good display performance can be obtained substantially without hysteresis.

Comparative Example 1

The same materials are used as in Example 1, and the same preparation method is employed except for not subjecting to the rubbing treatment to impart orientation to the surface of the alignment film. That is, onto the surfaces of the two substrates 101 and 108 transparent conductive films ITO (Indium Tin Oxide) are formed by the sputtering method. These substrates 101 and 108 are coated with the material for vertical alignment 4811 (available from Nissan Chemical Industries, Ltd.) using a spin coater, and the coated material is prebaked on a hot plate at 80° C. for 60 seconds, and then baked in an oven at 200° C. for 40 minutes. Thus, the alignment films 103 and 106 for vertical alignment, each having a thickness of about 100 nm are formed. Spacers having a diameter of 3 μm are spread onto the substrate 101, a binary epoxy adhesive is coated onto the outer periphery of the substrate 101, and the substrates 101 and 102 are so fixed that the cell thickness is 3 μm.

As the liquid crystal 104, No. 820050 (available from LCC Corporation), NI point 100.5° C., dielectric anisotropy $\Delta\varepsilon=-5.69$ is used. UV curable bifunctional monomer

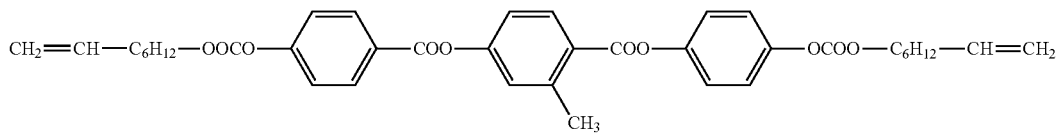

is added as a polymer precursor in an amount of 0.7, 1.4 or 2.0 wt % with regard to the composition comprising the liquid crystal and the polymer precursor. As the polymerization initiator, Irgacure 907 (available from BASF AG) is added in an amount of 15 wt % based on the amount of the bifunctional monomer. A mixture of the liquid crystal, the photopolymerizable monomer and the polymerization initiator is injected into the space between the substrates 101 and 108 by utilizing capillary forces. The liquid crystal cell is placed on a hot plate at a temperature of 101° C. to 103° C., and irradiated with UV rays for 32 minutes in a UV box (manufactured by KENIS Ltd.) at an intensity of 5.0 mW/cm² (352 nm), upon which the polymer 105 is formed by polymerization of the polymer precursors.

Figure 5:
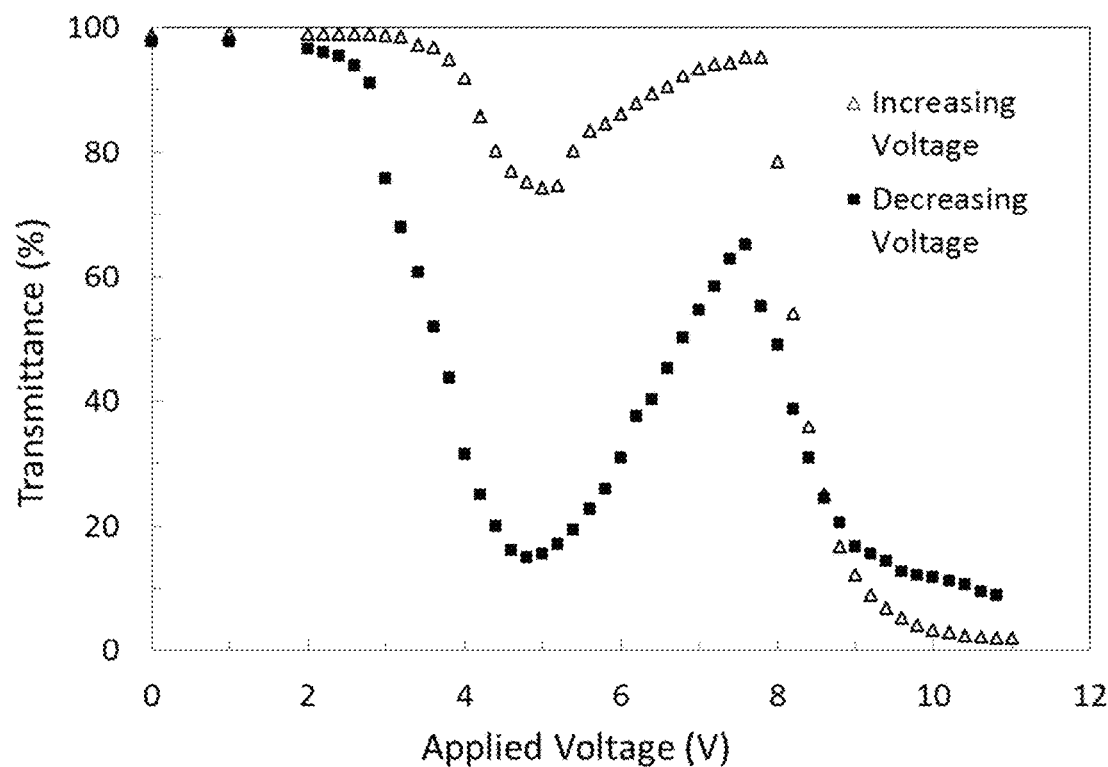
FIG. 5 is a graph showing the electrooptical characteristics of the polymer containing scattering type liquid crystal device of comparative example 1.

The voltage transmittance characteristic for increasing and decreasing voltage of a device which was manufactured using a liquid crystal mixture comprising 0.7 wt % of a bifunctional monomer is shown in FIG. 5. A rectangular wave of 0 to 11V with a frequency of 60 Hz is applied to the liquid crystal device. Regarding measurement of the transmission intensity, measurement of scattering intensity is carried out by irradiating the liquid crystal device with a He—Ne laser (632.8 nm), and observing the light by the Pin type photodiode S3883 (Hamamatsu Photonics K.K.).

When example 1 in FIG. 3 is compared with comparative example 1 in FIG. 5, it can be understood that a display can be obtained substantially without hysteresis by imparting inclined orientation to the surface of the alignment film of the present invention.

Comparative Example 2

The same materials as used in Example 2 are used in preparing this comparative example, and the same preparation method is employed except for not subjecting to the rubbing treatment to impart orientation to the surface of the alignment film. That is, on the surfaces of the two substrates 101 and 108 transparent conductive films ITO (Indium Tin Oxide) are formed by the sputtering method. These substrates 101 and 108 are coated with layers of the material for vertical alignment 4811 (available from Nissan Chemical Industries, Ltd.) using a spin coater, and the coated material is prebaked on a hot plate at 80° C. for 60 seconds, and then, baked in an oven at 200° C. for 40 minutes. Thus, the alignment films 103 and 106 for vertical alignment each having a thickness of about 100 nm are formed. Spacers having a diameter of 3 μm are spread onto the substrate 101, a binary epoxy adhesive is coated onto the outer periphery of the substrate 101, and the substrates 101 and 102 are fixed so that the cell thickness is 3 μm.

As the liquid crystal 104, No. 820050 (available from LCC Corporation), NI point 100.5° C., dielectric anisotropy $\Delta\varepsilon=-5.69$ is used. The UV curable monofunctional monomer

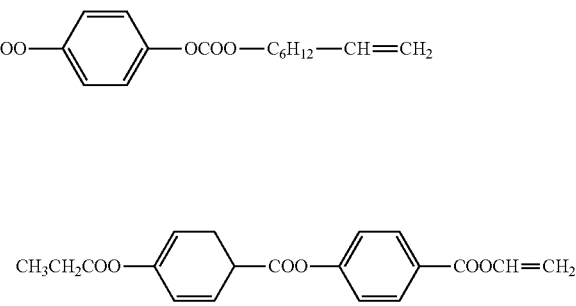

is added as a polymer precursor in an amount of 0.7, 1.4 or 2.0 wt % with regard to the composition comprising the liquid crystal and the polymer precursor. As the polymerization initiator, Irgacure 907 (available from BASF AG) is added in an amount of 15 wt % based on the amount of the monofunctional monomer. A composition of the liquid crystal, the photopolymerizable monomer and the polymerization initiator is injected into the space between the substrates 101 and 108 by utilizing capillary forces. The liquid crystal cell is placed on a hot plate at a temperature of 101° C. to 103° C., and irradiated with UV rays for 32 minutes in a UV box (manufactured by KENIS Ltd.) at an intensity of 5.0 mW/cm² (352 nm).

Figure 6:
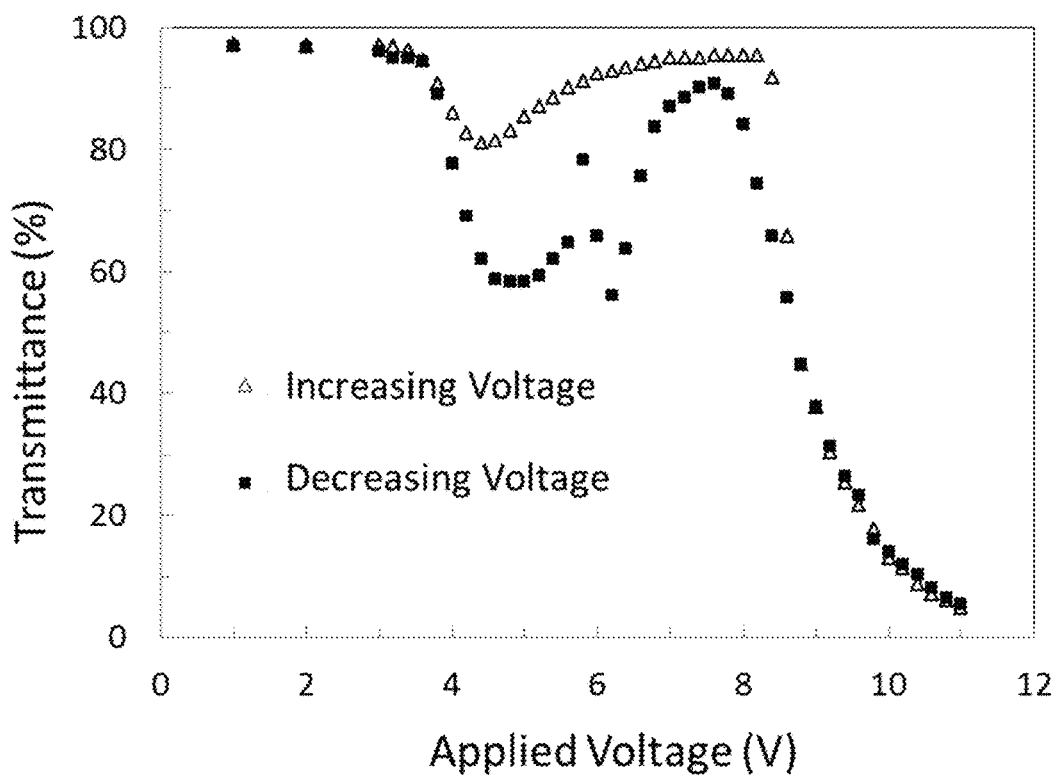
FIG. 6 is a graph showing the electrooptical characteristics of the polymer containing scattering type liquid crystal device of comparative example 2.

The voltage transmittance characteristic for increasing and decreasing voltage of a device which was manufactured using a liquid crystal mixture comprising 0.7 wt % of a monofunctional monomer is shown in FIG. 6. A rectangular wave of 0 to 11V with a frequency of 60 Hz is applied to the liquid crystal device. Regarding measurement of the transmission intensity, measurement of scattering intensity is carried out by irradiating the liquid crystal device with a He—Ne laser (632.8 nm), and receiving the light by the Pin type photodiode S3883 (Hamamatsu Photonics K.K.). FIG. 6 shows the change in transmittance when the voltage is increased from 0V to 11V, and when it is decreased from 11V to 0V. When example 2 in FIG. 4 is compared with comparative example 2 in FIG. 6, it can be understood that a display substantially without hysteresis can be obtained by imparting inclined orientation to the surface of the oriented film of the present invention.

An outline of the switching procedure of the present invention and comparative example is shown in FIG. 7. FIG. 7(a) shows the comparative example, where the liquid crystal molecules are oriented vertically to the substrate. Also, the polymers are both present as the material which is phase-separated and precipitated onto the substrate surface, i.e., onto the alignment film and as the material dispersed in the liquid crystal. When an AC electric field is applied, the liquid crystal molecules 104 at the inside of the liquid crystal device begin to orient in a direction that perpendicularly intersects the electric field direction. The polymer simultaneously starts to move following the movement of the liquid crystal. However, the liquid crystal molecules at the substrate interface are fixed by the polymer deposited onto the surface as described in US 2003'048'401A1, so that they can hardly be moved. The liquid crystal molecules are oriented vertically to the substrate without a preferred tilt direction, so that the rotating direction of the liquid crystal inside the liquid crystal device is not determined in one direction, but start rotating in random directions. As a result, a discontinuous point (disclination) 120 in the orientation of the liquid crystal is generated as shown in FIG. 7(a)(2), and Schlieren structure is formed. When the voltage is further increased, an unstable state in terms of electric fluidics as shown in FIG. 7(a)(3) appears, and a linear Williams domain is formed. When the voltage is further increased, as shown in FIG. 7(a)(4), scattering of the liquid crystal molecules is induced by the movement of the polymer inside the device. The cause of the hysteresis is the formation of the Schlieren structure shown in FIG. 7(a)(2), and the formation of the discontinuous point (disclination) is determined by the energy level of the system, so that it is due to the difference in formation voltages of the discontinuous point (disclination) at the rising and the falling voltage.

FIG. 7(b) shows a switching procedure of the present invention. The liquid crystal molecules 104 are oriented with a pretilt angle that inclines the liquid crystal molecules from the vertical to the substrate. Also, the polymers 105 are both present, as in comparative examples, as the material precipitated onto the substrate surface, i.e., onto the alignment film by phase separation and as the material dispersed in the liquid crystal. When an AC electric field is applied, the liquid crystal molecules inside the liquid crystal device begin to orient in a direction that perpendicularly intersects the electric field direction. The polymer at the inside thereof is simultaneously started to move following the movement of the liquid crystal. At this time, the liquid crystal molecules at the substrate interface are fixed by the polymer deposited onto the surface as disclosed in US 2003'048'401A1, so that they can hardly be moved. The liquid crystal molecules are oriented slightly inclined from the vertical to the substrate, so that the rotational direction of the liquid crystal inside the liquid crystal device can be determined in one direction. Accordingly, the discontinuous point (disclination) is not generated inside the liquid crystal device, so that the Schlieren structure is not formed (FIG. 7(b)(2)). When the voltage is further increased, an unstable state in terms of electric fluidics as shown in FIG. 7(b)(3) appears, and linear Williams domain is formed. When the voltage is further increased, as shown in FIG. 7(b)(4), scattering of the liquid crystal molecules is induced by the movement of the polymer inside the device.

In the present examples, a method of rubbing the substrate surface was used as to orient the liquid crystal and the polymer in the liquid crystal polymer composite layer slightly inclined in a certain direction from the substrate vertical direction, but the invention is not limited to the above, and any means may be used including photo-orientation, a PSA means in which irradiating with UV ray while applying an electric field thereto, etc.

Instead of a photoreactive monomer as used in the present examples, a heat polymerizable monomer may be used as well.

Comparative Example 3

A cell was made similar to example 1, using the same materials, but with the difference that the irradiation of the finished liquid crystal cell was done at 81° C. Hence the polymerization reaction was initiated below the NI point of the liquid crystal mixture (100.5° C.).

When an AC voltage was applied to the electrodes of the cell, a scattering state could also be observed, but the onset voltage was about three times higher than that of the cell in the example 1. In addition, the scattering efficiency was lower than in example 1.

The invention claimed is:

1. A method for manufacturing a polymer containing scattering type liquid crystal device, comprising the steps: providing two substrates with electrodes manufacturing a cell by arranging the two substrates with the electrodes on the inner side facing each other with a gap between the substrates, filling the cell with a liquid crystal mixture comprising a liquid crystal material having negative dielectric anisotropy and a polymer precursor, applying alignment treatment for the liquid crystal mixture either before or after filling the cell with the liquid crystal mixture, such that the liquid crystal mixture is oriented with a pretilt angle inclined from the normal direction to the substrate, and polymerizing the polymer precursor at a temperature higher than the clearing temperature of the liquid crystal mixture.

2. The method according to claim 1, wherein before the cell is manufactured an alignment layer for vertical alignment is formed at least on one of the substrates.

3. The method according to claim 1, wherein before the cell is manufactured a rubbing treatment is applied at least on one of the substrates to generate alignment with a pretilt angle the alignment layer.

4. The method according to claim 1, wherein before the cell is manufactured a photo-alignment layer for vertical alignment is formed at least on one of the substrates, and in another step the photo-alignment layer is exposed to aligning light such that alignment with a pretilt angle in the alignment layer is generated.

5. The method according to claim 1, wherein after the liquid crystal mixture is filled in the cell an electric or magnetic field is used to generate inclined alignment of the liquid crystal material with a pretilt angle with regard to the normal to the substrates.

6. The method according to claim 1, wherein the pretilt angle with regard to the normal to the substrates is between 0.2° and 10°.

7. The method according to claim 1, wherein the ratio of polymer precursor in the liquid crystal mixture is less than 10 wt %.

8. A polymer containing scattering type liquid crystal device comprising a composite layer having a liquid crystalline phase confined between two substrates, wherein the composite layer comprises a liquid crystal material having negative dielectric anisotropy and a polymer being dispersed therein, the liquid crystal having a pretilt angle with regard to the vertical direction when no electric field is applied, characterized in that the device has been manufactured using a method according to claim 1.

9. The polymer containing scattering type VA liquid crystal device according to claim 8,
wherein the device, measured without any additional layer has a transmission for visible light of more than 90% when no voltage is applied and that the device is in a scattering state upon applying a proper voltage.

10. The polymer containing scattering type liquid crystal device according to claim 8, wherein the polymer has been made from a monofunctional, bifunctional or polyfunctional acrylate.

11. The polymer containing scattering type liquid crystal device according to claim 8, wherein the polymer is phase separated from the liquid crystal material.

12. The polymer containing scattering type liquid crystal device according to claim 8, which changes to a scattering state for incident light when a proper voltage is applied to the electrodes.

13. The polymer containing scattering type liquid crystal device according to claim 8, wherein a polarizer is attached on each side of the cell.

14. The polymer containing scattering type liquid crystal device according to claim 8, which further comprises a reflector.

15. The polymer containing scattering type liquid crystal device according to claim 14, characterized by an additional polarizer.

16. The polymer containing scattering type VA liquid crystal device according to claim 8,
wherein the device, measured without any additional polarizers, has a transmission for visible light of more than 90% when no voltage is applied and that the device is in a scattering state upon applying a proper voltage.

17. The polymer containing scattering type liquid crystal device according to claim 8, wherein a polarizer is attached on each side of the cell with the polarization directions perpendicular to each other.

* * * * *